United States Patent [19]

Loucks et al.

[11] 4,374,959

[45] Feb. 22, 1983

[54] BLOCK COPOLYMERS OF POLYPHENYLENE OXIDES AND NON-STERICALLY-HINDERED HIGH MOLECULAR WEIGHT AROMATIC POLYCARBONATES

[75] Inventors: George R. Loucks, Scotia; John R. Campbell, Clifton Park, both of N.Y.

[73] Assignee: General Electric Company, Schenectady, N.Y.

[21] Appl. No.: 309,626

[22] Filed: Oct. 8, 1981

Related U.S. Application Data

[62] Division of Ser. No. 250,338, Apr. 2, 1981.

[51] Int. Cl.$^3$ .................. C08L 71/04; C08L 69/00
[52] U.S. Cl. .................. 525/394; 525/905; 528/125; 528/167; 528/171; 528/202
[58] Field of Search .................. 525/394, 462, 905; 528/202

[56] References Cited

U.S. PATENT DOCUMENTS 3,342,892  9/1967  Laakso et al. .................. 260/823
3,875,256  4/1975  White .................. 525/394

Primary Examiner—Theodore E. Pertilla
Attorney, Agent, or Firm—Richard J. Traverso; James C. Davis, Jr.; James Magee, Jr.

[57] ABSTRACT

This invention relates to block copolymers of polyphenylene oxides and non-sterically-hindered high molecular weight aromatic polycarbonates. These block copolymers can be molded, calendered, or extruded as films, sheets, fibers, laminates or other useful articles of manufacture.

6 Claims, No Drawings

BLOCK COPOLYMERS OF POLYPHENYLENE OXIDES AND NON-STERICALLY-HINDERED HIGH MOLECULAR WEIGHT AROMATIC POLYCARBONATES

This application is a division of application Ser. No. 250,338, filed Apr. 2, 1981.

CROSS-REFERENCE TO RELATED APPLICATIONS

This invention is related to U.S. patent application Ser. No. 250,511, filed Apr. 2, 1981 entitled "Block Copolymers of Polyphenylene oxides and Sterically-Hindered Aromatic Polycarbonates" filed concurrently herewith of George R. Loucks. Both applications are assigned to the assignee of this invention. All of the disclosure described in Ser. No. 250,511 is incorporated herein by reference in its entirety.

BACKGROUND OF THE INVENTION

1. Field of the Invention

This invention relates to block copolymers of polyphenylene oxides and non-sterically-hindered high molecular weight aromatic polycarbonates. These block polymers can be molded, calendered, or extruded as films, sheets, fibers, laminates or other useful articles of manufacture.

2. Description of the Prior Art

Low-molecular weight bis(polyphenylene)-carbonate block copolymers having limited carbonate segment number average molecular weights, of 250 to 5500, are well known and are described in D. M. White's U.S. Pat. No. 3,875,256. These polyphenylene oxide aromatic carbonate block copolymers are formed by the reaction of carbonyl halides or bishaloformates e.g., phosgene or bis-chloroformates, respectively, with polyphenylene oxide in the presence of a hydrogen halide acceptor e.g. an alkali metal hydroxide, an alkaline earth metal hydroxide or oxide or a tertiary amine.

Monofunctional polyphenylene oxides having an average hydroxyl group per molecule of 1.0 or less are described in A. S. Hay's U.S. Pat. Nos. 3,306,879; 3,914,266; and 4,028,341, etc., among others.

Polyfunctional polyphenylene oxides having an average hydroxyl group per molecule greater than zero including 2.0 or less are described in D. M. White's U.S. Pat. Nos. 4,140,675 and 4,234,706 among others.

DESCRIPTION OF THE INVENTION

This invention embodies block copolymers of polyphenylene oxides and high molecular weight aromatic polycarbonates.

In general, illustrative of the broad group of block copolymers of polyphenylene oxides and high molecular weight aromatic polycarbonates (hereinafter also referred to as "HMW-aromatic-PC") included within the scope of this invention are those described among others by the following model structures:

AZ(CZ)$_x$, BZ(CZ)$_x$, AZ(CZ)$_x$A, AZ(CZ)$_x$B, BZ(CZ)$_x$B, (I) AZ(CZ)$_x$BZ(CZ)$_x$A, AZ(CZ)$_x$BZ(CZ)$_x$(CZ)$_x$B, AZBZ(CZ)$_x$BZ(CZ)$_x$BZA, etc., etc., etc.

wherein x is a number of from 30 to 200 or higher, preferably from 40 to 100, and frequently from 40 to 70.

The above illustrative linear combinations of mono- and polyfunctional polyphenylene oxides, HMW-aromatic-PC and carbonyl halides including random and/or alternating arrangements of the polymer segments defined by the units A, B, (CZ)$_x$, or coupling agent Z, which units and coupling agents are described in greater detail hereafter are not intended to limit the combinations that can be obtained by the practice of this invention —subject to the proviso that the number average degree of polymerization ($\overline{DP}_n$) represented by x in the above model structures is at least 30.

The expression polyphenylene oxides includes "monofunctional polyphenylene oxides" well known to those skilled in the art having an average hydroxyl group per molecule value greater than zero including 1.0 or less. These polyphenylene oxides can be prepared by any of the methods of the prior art, and may be illustrated by formula (II) set out hereafter:

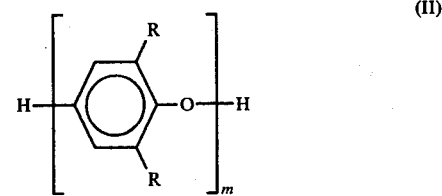

where independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (II) above wherein the hydrogen atom is disassociated from the monohydroxy group of the polyphenylene oxide, i.e., a phenoxy radical, which may be referred to as a monovalent phenoxy radical. These segments are abbreviated herein by the unit-A.

The expression "polyphenylene oxide" also includes "polyfunctional polyphenylene oxides" also well known to those skilled in the art including quinone-coupled polyphenylene oxides having an average hydroxyl group per molecule greater than zero including 2.0 or less. These polyphenylene oxides can be prepared by the methods described in U.S. Pat. No. 4,234,706 and may be illustrated by formula (III) set out hereafter:

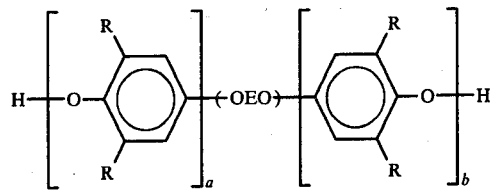

wherein independently —OEO— is a divalent quinone residue, E is a divalent arene radical, either a or b is at least equal to 1, the sum of a plus b is preferably at least equal 10, more preferably 40 to 170, and R is the same as in formula (II) above. The polyfunctional polyphenylene oxide units (segments) of the block polymers can be conceptualized by the structure of formula (III) above wherein the hydrogen atoms are disassociated from the hydroxy groups of the quinone-coupled polyphenylene oxide, i.e., a quinone-coupled polyphenoxy radical, which may be referred to as a divalent phenoxy radical. These segments are abbreviated herein by the unit —B—.

The expression "NSH-HMW-aromatic-PC" as employed herein and in the claims includes any non-sterically-hindered high molecular weight aromatic polycarbonate derived from any non-sterically hindered (NSH)-dihydroxy aromatic compound, including any dihydric phenol free of steric-hinderance, i.e., dihydric phenols having neither hydroxy group sterically-hindered by the presence of more than one halogen, hydrocarbon, or hydrocarbonoxy group ortho-positioned relative to the hydroxy groups of the dihydric phenol. Sterically-hindered is defined herein as the presence of a halogen, hydrocarbon or hydrocarbonoxy group directly bonded to each carbon atom ortho-positioned (adjacent to) the carbon atoms directly bonded to the hydroxyl groups of the dihydric phenol. Non-sterically-hindered dihydric phenols known to those skilled in the art, described in detail in D. W. Fox's U.S. Pat. No. 3,153,008 and Great Britain Pat. No. 1,222,003, can be illustrated by formula (IV) set out hereafter.

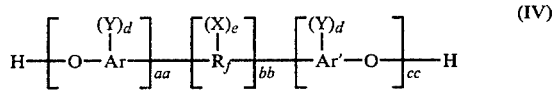

(IV)

where $R_f$ is an alkylene, alkylidene including "vinylidene", cycloalkylene, cycloalkylidene or arylene linkage or a mixture thereof, a linkage selected from the group consisting of ether, carbonyl, amine, a sulfur or phosphorous containing linkage, Ar and Ar' are arene radicals, Y is bromine, chlorine or a monovalent alkyl or alkoxy group, each d represents a whole number up to a maximum equivalent to the number of replaceable hydrogens substituted on the aromatic rings comprising Ar or Ar'—subject to the proviso that when d is equal to two or more, no more than one Y group is ortho-positioned relative to an —OH group, X is bromine, chlorine or a monovalent hydrocarbon group selected from the class consisting of alkyl, aryl and cycloalkyl including 0, e represents a whole number of from 0 to a maximum controlled by the number of replaceable hydrogens on $R_f$, aa, bb, cc represent whole numbers including 0, when bb is not zero, neither aa or cc may be zero, otherwise either aa or cc but not both may be 0, when bb is zero, the aromatic groups can be joined by a direct carbon bond.

Examples of non-sterically hindered bis-phenols (hereinafter also referred to as "NSH-dihydric phenols" or "NSH-dihydroxy aromatic compounds") of formula (IV) are the following:
resorcinol;
4,4′-dihydroxy-diphenyl;
1,6-dihydroxy-naphthalene;
2,6-dihydroxy-naphthalene;
4,4′-dihydroxy-diphenyl methane;
4,4′-dihydroxy-diphenyl-1,1-ethane;
4,4′-dihydroxy-diphenyl-1,1-butane;
4,4′-dihydroxy-diphenyl-1,1-isobutane;
4,4′-dihydroxy-diphenyl-1,1-cyclopentane;
4,4′-dihydroxy-diphenyl-1,1-cyclohexane;
4,4′-dihydroxy-diphenyl-phenyl methane;
4,4′-dihydroxy-diphenyl-2-chlorphenyl methane;
4,4′-dihydroxy-diphenyl-2,4-dichlorophenyl methane;
4,4′-dihydroxy-diphenyl-p-isopropylphenyl methane;
4,4′-dihydroxy-diphenyl-2,2-propane;
4,4′dihydroxy-3-methyl-diphenyl-2,2-propane;
4,4′-dihydroxy-3-cyclohexyl-diphenyl-2,2-propane;
4,4′-dihydroxy-3-methoxy-diphenyl-2,2-propane;
4,4′-dihydroxy-3,3′-dimethyl-diphenyl-2,2-propane;
4,4′-dihydroxy-3,3′-dichloro-diphenyl-2-2-propane;
4,4-dihydroxy-diphenyl-2,2-butane;
4,4′-dihydroxy-diphenyl-2,2-pentane;
4,4′-dihydroxy-diphenyl-2,2-(4-methyl pentane);
4,4′-dihydroxy-diphenyl-2,2-n-hexane;
4,4′-dihydroxy-diphenyl-2,2-nonane;
4,4′-dihydroxy-diphenyl-4,4-heptane;
4,4′-dihydroxy-diphenyl phenylmethyl methane;
4,4′-dihydroxy-diphenyl-4-4chlorophenylmethyl methane;
4,4′-dihydroxy-diphenyl-2,5-dichlorophenylmethyl methane;
4,4′-dihydroxy-diphenyl-3,4-dichlorophenylmethyl methane;
4,4′-dihydroxy-diphenyl-2-naphthylmethyl methane;
4,4′-dihydroxy-tetraphenyl methane;
4,4′-dihydroxy-diphenyl-1,2-ethane;
4,4′-dihydroxy-diphenyl-1,10-n-decane;
4,4′-dihydroxy-diphenyl-1,6(1,6-dioxo-n-hexane);
4,4′-dihydroxy-diphenyl-1,10(1,10-dioxo-n-decane);
bis-p-hydroxy-phenylether-4,4′-biphenyl;
a,a,a′,a′-tetramethyl-a,a′-di-(p-hydroxyphenyl)-p-xylylene;
a,a,a′,a′-tetramethyl-a,a′-di(-p-hydroxyphenyl)-m-xylylene;
4,4′-dihydroxy-3,3′-dimethyl-diphenyl methane;
4,4′-dihydroxy-2,2′-dimethyl-diphenyl methane;
4,4′-dihydroxy-3,3′-dichloro-diphenyl methane;
4,4′-dihydroxy-3,3′-dimethoxy-diphenyl methane;
4,4′-dihydroxy-2,2′,5,5′-tetramethyl-diphenyl methane;
4,4′-dihydroxy-2,2′-dimethyl-5,5′-diisopropyldiphenyl methane;
4,4′-dihydroxy-2,2′-dimethyl-5,5′-dipropyl-diphenyl methane;
4,4′-dihydroxy-2,2′-dimethyl-5,5′-di-tert.-butyldiphenyl methane;
4,4′-dihydroxy-diphenyl-5,5-nonane;
4,4,′-dihydroxy-diphenyl-6,6-undecane;
4,4′-dihydroxy-diphenyl-3,3-butanone-2;
4,4′-dihydroxy-diphenyl-4,4-hexanone-3;
4,4′-dihydroxy-diphenylmethyl-4-methoxyphenyl methane;
4,4′-dihydroxy-diphenyl ether;
4,4′-dihydroxy-diphenyl sulfide;
4,4′-dihydroxy-3,3′-dimethyldiphenyl sulfide;
4,4′-dihydroxy-diphenyl sulfoxide;
4,4′-dihydroxy-diphenyl sulfone;
4,4′-dihydroxy-3,3′-dichlorodiphenyl sulfone;
2,2′-bis(4-hydroxy-phenyl)-1-chloroethylene;
2,2′-bis(4-hydroxy-phenyl)-1,1-dichloroethylene; and
2,2′-bis(4-hydroxy-phenyl)-1,1-dibromoethylene, etc.

The expression NSH-HMW-aromatic-PC as employed herein and in the claims includes polycarbonates containing a major portion, i.e. more than 50, and frequently 90–100 mol percent of NSH-HMW polycarbonate moieties derived from NSH-dihydroxy aromatic compounds and a minor portion, i.e., less than 50, and frequently 0–10 mol percent to SH-poly-carbonate moieties derived from SH-dihydroxy aromatic compounds. The SH-dihydroxy aromatic compounds are described in detail in contemporaneously filed U.S. application Ser. No. (RD-11426) of George R. Loucks. For brevity, the disclosure of RD-11426 is incorporated herein in its entirety by reference. Some specific examples of SH-bisphenols (hereinafter also referred to as "SH-dihydric phenols" or as "SH-dihydroxy aromatic compounds") follow:

1,1-bis(4-hydroxy-3,5-dimethylphenyl) methane;
2,4'-dihydroxy-3,3',5,5'-tetramethyldiphenyl methane;
1,1-bis(3,5-diethyl-4-hydroxyphenyl) methane;
1,1-bis(3,5-diisopropyl-4-hydroxyphenyl) methane;
1,1-bis(3,5-dibromo-4-hydroxyphenyl) methane;
1,1-bis(3,5-dimethyl-4-hydroxyphenyl) ethane;
1,1-bis(3-methyl-5-ethyl-4-hydroxyphenyl) ethane;
1,1-bis(3,5-diethyl-4-hydroxyphenyl) ethane;
2,2-bis(3-methyl-5-ethyl-4-hydroxyphenyl) propane;
2,2-bis(3,5-dibromo-4-hydroxyphenyl) propane;
2,2-bis(3,5-diisopropyl-4-hydroxyphenyl) propane;
2,2-bis(4-hydroxy-3,5-dimethylphenyl) propane;
2,2-bis(3,5-dibromo-4-hydroxyphenyl) butane;
2,4'-dihydroxy-3,3',5,'5'-tetramethylbenzophenone;
4,4'-dihydroxy-3,3',5,5'-tetraethyldiphenyl sulfone;
4,4'-dihydroxy-3,3',5,5'-tetrabutyldiphenyl sulfide;
4,4'-dihydroxy-3,3',5,5'-tetramethyldiphenyl ether;
4,4'-dihydroxy-3,3',5,5'-tetrapropyldiphenyl sulfoxide;
2,2'-bis(3,5-dimethyl-4-hydroxyphenyl)-1-chloroethylene;
2,2'-bis(3,5-dimethyl-4-hydroxyphenyl)-1,1-dichloroethylene; and
2,2'-bis(3,5-dibutoxy-4-hydroxyphenyl)-1,1dibromoethylene, etc.

The difunctional NSH— (and SH—, if present) HWM-aromatic-PC portion of the polymers derived from NSH-dihydroxy aromatic compounds can be conceptualized by the NSH-structure of formula (IV) above (the SH-structure of formula (IV) set out in RD-11426) or the SH-specific examples above, wherein the hydrogen atoms are disassociated from the hydroxyl groups of the NSH- and SH-dihydroxy aromatic compounds. These segments are abbreviated herein by the formula —C—.

The expression "carbonyl halides" as employed herein and in the claims includes carbonyl dichloride —more commonly known as phosgene, carbonyl dibromide, carbonyl diiodide, carbonyl difluoride, carbonyl chlorofluoride, including mixtures thereof. The coupling agent of the block copolymers can be conceptualized by the

carbonyl radical wherein halogen atoms are disassociated from a carbonyl halide. These copolymer segments are abbreviated herein by the symbol —Z—.

The high molecular weight NSH-aromatic polycarbonate segments associated with the block copolymers may be illustrated by formula (V) set out hereafter;

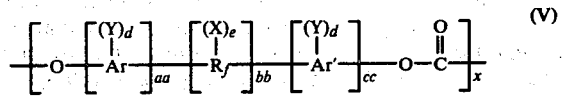

where $R_f$, Ar, Ar', Y, d, X, e, aa, bb, and cc are as defined above, and are referred to herein as divalent HMW-aromatic polycarbonate radicals, abbreviated herein by the formula —(CZ)—$_x$, where C, Z are as previously defined, and x is a number at least equal to 30.

Presently preferred HMW-aromatic-PC segments may be illustrated by formulas (VI) and (VII) set out hereafter:

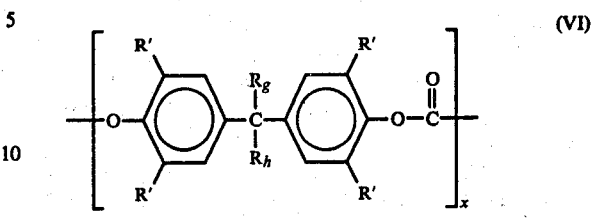

and

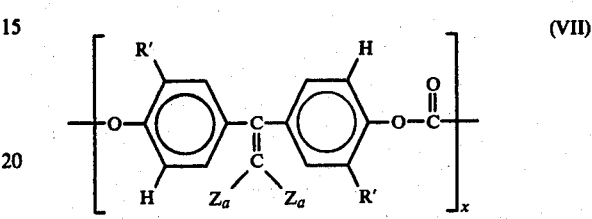

where independently each R' is hydrogen, bromine, chlorine, or a $C_{1-4}$ alkyl or alkoxy group, $R_g$ and $R_h$ are hydrogen or a $C_{1-2}$ alkyl group, each $Z_a$ is hydrogen, chlorine or bromine, subject to the proviso that at least one $Z_a$ is chlorine or bromine, and x is as previously defined.

The process of preparing the block copolymers of polyphenylene oxides and NSH—NMW-aromatic—PC requires the combination of reactants in accordance with the following general process parameters:
(1) Forming an agitated, two-phase mixture comprising
  (i) an organic phase containing a polyphenylene oxide, an NSH-aromatic dihydroxy compound, an inert organic solvent, a tertiary amine catalyst, and optionally, a SH-aromatic dihydroxy compound and/or a phase transfer agent,
  (ii) an aqueous phase containing a solution of an alkali metal hydroxide having a pH value of at least 11, preferably 12 to 13 or even higher,
(2) Adding and reacting a carbonyl halide with both the polyphenylene oxide and NSH-aromatic dihydroxy compound—plus any, optional SH-aromatic dihydroxy compound, to form the block copolymer, and
(3) Recovering the polyphenylene oxide and high molecular aromatic polycarbonate.

The process parameter related to pH is maintained throughout the course of the reaction by any means, such as, optionally, by the initial addition of large excesses of aqueous alkali metal hydroxide including the substantially continuous addition of alkali metal hydroxide during the course of a reaction, e.g., concurrently with the carbonyl halide addition.

Any inert solvent can be employed, including medium polar solvents, such as chlorobenzene, methylene chloride, 1,2-dichloroethane, bromobenzene, orthodichlorobenzene, iodobenzene, etc. including mixtures thereof. Preferably the solvents are halogenated hydrocarbons, more preferably methylene chloride.

The interfacial polycondensation and coupling process of this invention is carried out in any strongly basic reaction medium, i.e., pH 11 or higher, provided by the presence of a strong inorganic base, including mixtures thereof. Representative of basic species which can be employed are the following: basic quaternary ammonium, quaternary phosphonium or tertiary sulfonium hydroxide; alkali metal hydroxides; etc. Specific examples are tetramethyl ammonium hydroxide, tetraethyl phosphonium hydroxide, etc.; the lithium, sodium and potassium hydroxides etc. Especially preferred are sodium or potassium hydroxide.

Any tertiary amine can be employed. Illustrative tertiary amines follow: trimethylamine, triethylamine, allyldiethylamine, benzyldimethylamine, dioctylbenzylamine, dimethylphenethylamine, 1-dimethylamino-2-phenylpropane, N,N,N',N'-tetramethylethylenediamine, N-methylpiperidine, 2,2,6,6,N-pentamethylpiperidine, etc. Presently preferred are aliphatic amines, especially triethyl amine.

Optionally, however, not essential to the process of this invention, a phase transfer agent can be employed to enhance the process reaction rate. Preferably, the phase transfer agents is selected from the group consisting of quaternary ammonium, quaternary phosphonium, and tertiary sulfonium compounds or mixtures thereof. These phase transfer agents are well known and include illustratively "Onium compounds" described by C. M. Starks in J.A.C.S. 93, 195 (1971). Specific illustrative examples are described in U.S. Pat. No. 4,201,721 whose descriptions are incorporated herein in their entirety by reference.

Any amount of functionally reactive polyphenylene oxide, NSH-dihydric aromatic compound and carbonyl halide can be employed, subject to the proviso that the carbonyl halide is present in stoichiometric amounts at least sufficient to react with the hydroxy groups associated with the polyphenylene oxide and the aromatic dihydroxy compounds. Preferably, the carbonyl halide is present in excess i.e., at least about 1 times to as much as 2 to 3 times the stoichiometric amounts required to completely couple all of the reactive polyphenylene oxide and aromatic dihydroxy compounds.

Any amount of base can be employed subject to the proviso that the agitated two-phase mixture is maintained at a pH value in excess of about 11, preferably 12–13 and, optionally, as high as 14. Generally effective mol proportions of base relative to the hydroxyl groups associated with the polyphenylene oxide and the aromatic dihydroxy compounds are within the range from about 2:1 to 10:1, and frequently preferably are from about 3:1 to 5:1.

Any amount of tertiary amine can be employed, however, generally effective mol proportions of amine relative to the dihydroxy aromatic compound are within the range of from about 0.01 to 0.25:1 and more frequently, preferably are within the range of from about 0.05:1 to about 0.10:1.

Any amount of phase transfer agent can be employed, however, generally effective mol proportions of the phase transfer agent relative to the base are within the range of from about 1:10 to about 1:1000 and more frequently, preferably, are within the range of from about 1:100 to 1:500.

The reactions can be carried out at any temperature. Preferably, temperatures within the range of from about 0° to 100° C. or even higher, and more preferably from 20° C. to 100° C. are employed.

The best mode of practicing this invention is set out in the Examples hereinafter.

EXAMPLE 1

(A) Preparation of Mono-Functional Polyphenylene Oxide

A 12 liter Morton flask equipped with a stirrer, oxygen inlet, thermometer, and addition funnel was charged with 3.24 liters toluene, 100 g. 2,6-xylenol, 5.71 ml. of a stock catalyst solution, i.e. (19.31 g. cuprous oxide added slowly with stirring to 100 ml. of a 47.2% aqueous hydrogen bromide (HBr) solution), 33.7 ml. N,N'-di(t-butyl)ethylene diamine (DBEDA), 49.1 g. N,N-dimethylbutylamine (DMBA), and 17.5 ml. (22 w/v) tricaprylylmonomethylammonium chloride (Adogen 464). Oxygen was bubbled into the resulting admixture at a rate of 4.0 SCFH while vigorously agitating the admixture. 900 g. of 2,6 xylenol dissolved in 6 liters of toluene was added dropwise to the flask over a 30 minute period. The temperature rose from 25° to 35°. After 90 minutes, the polymerization reaction was terminated by adding 112 ml. of a 38% aqueous solution of trisodium ethylenediamine tetraacetate ($Na_3EDTA$). The polymer was precipitated by adding three volumes of methanol. The precipitated polymer was filtered and washed with methanol yielding a white solid reaction product having an intrinsic viscosity of 0.30 dl./g. measured in chloroform at 25° C. From the infrared absorption spectrum of the polymer at 3610 $cm^{-1}$ a hydroxyl content of 0.96 —OH group per polymer chain was calculated.

EXAMPLE 2

(A) Preparation of Block Copolymers of Polyphenylene Oxides and High Molecular Weight Aromatic Polycarbonates A series of carbonate coupled block copolymers was generally prepared according to the following detailed procedure with respect to Run No. I, further described in Table I and II which also follow:

A 500 ml. 5-neck round-bottom flask equipped with a mechanical stirrer, condenser, pH probe, caustic addition funnel and phosgene inlet tube was charged with 12.0 mono-functional polyphenylene oxide—prepared as described in EXAMPLE 1(A) above, and 120 ml. of methylene chloride. The mixture was stirred and heated to reflux, i.e., approximately 40° C. and 7.3 g. of bis(4-hydroxyphenyl) propane-2,2,, 100 ml. of water, 0.485 g. of triethylamine was added. The pH of the mixture was adjusted to 13 by the addition of 4 ml. of a 50% sodium hydroxide solution of a 50% sodium hydroxide solution. Phosgene was passed through the agitated mixture at 0.35 g. per minute from a calibrated flow meter while adding approximately 20 ml. of 50% aqueous sodium hydroxide solution—during the course of the reaction—in order to maintain a relatively constant pH value of 13. After 26 minutes the phosgene flow was stopped and the solution diluted with 150 ml. of chloroform. A resulting emulsion was diluted with 150 ml. of water, the aqueous layer was separated, and the organic layer was washed successively, twice with 150 ml. of dilute hydrochloric acid, and twice with 150 ml. of water. The acid water washed phase was diluted with 5 volumes of methanol in a high speed mixing blender. The resulting block copolymer was filtered, dried overnight in vacuo at approximately 50° C. The polymer had an intrinsic viscosity [$\eta$] of 0.50 dl./g. measured in chloroform at 25.0° C. Molecular weight was determined by GPC analysis based on a polystyrene calibration.

A 0.75 g. sample of the resulting block copolymer was compression molded into a disk 1 ml. thick and 2.5 cm. in diameter at 270° C. and 5000 psi in a laboratory press. The disk was transparent.

A film cast from a solution of the block copolymer in copolymer in chloroform was also transparent and flexible.

A resume of the product reaction parameters and product properties are set out in Tables I and II, respectively, which correspond to a series of runs carried out in a manner analogous to that described in detail above.

TABLE I
REACTION PARAMETERS

| Run No. | BPA (g) | PPO (g) | PPO $[\eta]$ | TEA (mol. %) | $COCl_2$ (g) | $H_2O$ (ml) | $CH_2Cl_2$ (ml) | Phenol (mol. %) |
|---|---|---|---|---|---|---|---|---|
| I | 7.3 | 12.0 (A) | 0.30 | 15 | 9.1 | 100 | 120 | — |
| II | 7.3 | 12.0 (A) | 0.30 | 5 | 9.5 | 100 | 120 | — |
| III | 7.3 | 12.0 (A) | 0.30 | 1 | 9.68 | 100 | 120 | — |
| IV | 14.6 | 10.0 (A) | 0.30 | 1.1 | 14.6 | 100 | 120 | 1.71 |
| V | 14.6 | 5.0 (A) | 0.30 | 1.1 | 15.1 | 100 | 120 | 2.7 |

TABLE II
COPOLYMER PROPERTIES

| Run No. | Yield % | I.V. $[\eta]$ | Tg (°C.) | Wt. % PPO | GPC Data Mw | Mn | Mw/Mn |
|---|---|---|---|---|---|---|---|
| I | >95 | 0.50 | 158,195 | 60 | 60,400 | 19,484 | 3.1 |
| II | >95 | 0.47 | 161,193 | 60 | 51,000 | 14,050 | 3.63 |
| III | >95 | 0.46 | — | 60 | 55,400 | 17,871 | 3.10 |
| IV | >95 | 0.56 | — | 38 | 66,100 | 20,656 | 3.2 |
| V | >95 | 0.59 | | 23 | 71,200 | 18,256 | 3.9 |

Gel permeation chromotography (GPC) molecular weight distribution curves for the block copolymers revealed no bimodal molecular weight distributions and at most "small shoulders" on either the high or low molecular weight sides of the curves. Superimposition of the chromatograms of the very high molecular weight copolymers of Runs I and IV and the chromatograms of the starting polyphenylene oxide revealed the presence of very little unreacted polyphenylene oxide i.e., only a slight "tailing" on the low molecular weight end was observed.

Proton NMR analysis of the block copolymers revealed that substantially all, i.e., 95% or more, of the polyphenylene oxide and bisphenol-A was incorporated in the block copolymers.

A qualitative analysis of the block copolymers—based upon the observation that a chloroform solution of the block copolymers remain colorless after standing for more than a week—provided evidence that substantially all of the polyphenylene oxide hydroxyl end-groups were coupled with the polycarbonate segments of the block copolymers.

All discs and films of the block copolymers of Runs II–V were transparent. All films were flexible.

A summary of the solid solution properties of the block copolymers is set out in Table III.

TABLE III

| BLOCK COPOLYMER PPO (Wt. %) | BPA (Wt. %) | SOLID SOLUTION |
|---|---|---|
| 1 to 100 | 100 to 1 | Transparent (single phase) |

COMPARATIVE DATA—NOT PART OF THIS INVENTION

A series of blends of homopolymers of poly(2,6-dimethyl-1,4-phenylene oxide) also referred to herein as polyphenylene oxide ("PPO"), and homopolymers of bis(4-hydroxyphenyl)propane-2,2 also referred to herein as bisphenol-A polycarbonate ("BPA") were prepared according to the following general procedure.

Compression molded discs were prepared from PPO and BPA by dissolving the polymers in a suitable solvent, e.g., chloroform, (2) precipitating the polymer blends by the addition to an antisolvent e.g., methanol, (3) drying the resulting blends under vacuum at 50°–60° C. overnight, and (4) compression molding 0.75 grams of the polymer mixtures into discs 1 mm. thick and 2.5 cm. in diameter at 270° C. and 5000 psi in a laboratory press. The resulting discs—depending upon the proportions of the respective homopolymers present in blends—were found to be either transparent (indicating a solid solution single phase) or translucent (indicating a multiple phase solid solution).

A summary of the solid solution properties of the blends of the homopolymers is set out in Table IV.

TABLE IV
HOMOPOLYMER BLENDS

| PPO (Wt. %) | BPA (Wt. %) | SOLID SOLUTION |
|---|---|---|
| 0 to 25 | 100 to 75 | Transparent (single phase) |
| >25 to <90 | <75 to >10 | Translucent (multiple phase) |
| 90 to 100 | 10 to 0 | Translucent - Transparent (Multiple-Single Phase) • |

The polyphenylene oxide employed in the blends was manufactured in accordance with the process parameters described in A. S. Hay's U.S. Pat. No. 4,048,143. The specific polymer employed exhibited an intrinsic viscosity of 0.50 dl./g. measured in chloroform at 25° C.

The bisphenol-A polycarbonate employed in the blends was commercially manufactured G. E. Lexan(TM) grade 140 polycarbonate and exhibited an intrinsic viscosity of 0.53 dl./g. measured in chloroform at 25° C.

The block copolymers of polyphenylene oxide and nonsterically-hindered aromatic high molecular weight polycarbonates of this invention preferably exhibit intrinsic viscosities greater than about 0.3 dl./g. measured in chloroform at 25° C. Preferably these block copolymers generally exhibit a NSH-aromatic polycarbonate segment—(CZ)—$_x$ number average degree of polymerization ($DP_n$) equal to about 30 at block copolymer intrinsic viscosities of 0.3 dl./g. and a $DP_n$ of about 50 at block copolymer intrinsic viscosities of about 0.7 dl./g. measured in chloroform at 25° C.

The block polymers of this invention can be molded, calendered, or extruded as films, sheets, fibers, laminates or other useful articles of manufacture at temperatures of about 500° F. to about 650° F. employing conventional processing equipment for engineering thermoplastic materials including extruders, e.g. mono and multiple screw types, mills or other mechanical equipment which subject engineering thermoplastic materials to high sheer stress at elevated temperatures.

We claim:

1. A process of forming a block copolymer of polyphenylene oxide and an non-sterically-hindered high molecular weight aromatic polycarbonate comprising the following process sequence:
   (1) Forming an agitated two-phase mixture comprising,
      (i) an organic phase containing a polyphenylene oxide, an nonsterically hindered-aromatic dihydroxy compound, an inert organic solvent, a tertiary amine, and, optionally, a sterically hindered-aromatic dihydroxy compound,
      (ii) an aqueous phase containing a solution of an alkali metal hydroxide having a pH value of at least 11,
   (2) Adding and reacting a carbonyl halide with both the polyphenylene oxide and the nonsterically hindered-aromatic dihydroxy compound plus any, optional sterically hindered-aromatic dihydroxy compound, to form a block copolymer and
   (3) Recovering the polyphenylene oxide and non-sterically hindered-aromatic polycarbonate block copolymer.

2. The claim process 1 wherein the nonsterically hindered-aromatic dihydroxy compound is present as a major portion relative to a minor portion of a sterically hindered-aromatic dihydroxy compound.

3. The claim 2 process wherein the nonsterically hindered-aromatic dihydroxy compound portion is present in an amount at least equal to 90 mol percent relative to a sterically hindered-aromatic dihydroxy compound.

4. The claim 3 process wherein the polyphenylene oxide is poly(2,6-dimethyl-1,4-phenylene oxide) and the nonsterically hindered-aromatic dihydroxy compound is bis(4-hydroxyphenyl)-propane-2,2.

5. The claim 4 process wherein the alkali metal hydroxide is sodium hydroxide and the tertiary amine is triethylamine.

6. The claim 5 process wherein a phase transfer agent is present.

* * * * *